(12) United States Patent
Stamos et al.

(10) Patent No.: US 9,015,858 B2
(45) Date of Patent: *Apr. 21, 2015

(54) GRAPHICAL USER INTERFACE FOR SEAMLESS SECURE PRIVATE COLLABORATION

(71) Applicant: nCrypted Cloud LLC, Boston, MA (US)

(72) Inventors: Nicholas Stamos, Belmont, MA (US); Igor Odnovorov, Walpole, MA (US)

(73) Assignee: nCrypted Cloud LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/027,441

(22) Filed: Sep. 16, 2013

(65) Prior Publication Data

US 2014/0157435 A1 Jun. 5, 2014

Related U.S. Application Data

(63) Continuation of application No. 13/743,051, filed on Jan. 16, 2013, now Pat. No. 8,572,757, which is a continuation of application No. 13/690,800, filed on Nov. 30, 2012, now abandoned.

(51) Int. Cl.
*H04L 29/06* (2006.01)
*H04L 9/08* (2006.01)
*G06F 21/62* (2013.01)
*H04L 29/08* (2006.01)

(52) U.S. Cl.
CPC .............. *H04L 63/04* (2013.01); *H04L 9/0863* (2013.01); *H04L 63/0428* (2013.01); *G06F 21/6209* (2013.01); *H04L 67/1095* (2013.01); *H04L 63/083* (2013.01)

(58) Field of Classification Search
USPC ......................................... 726/28; 705/1, 76
See application file for complete search history.

(56) References Cited

U.S. PATENT DOCUMENTS

| | | |
|---|---|---|
| 6,405,315 B1 | 6/2002 | Burns et al. |
| 7,010,689 B1 | 3/2006 | Matyas, Jr. et al. |
| 7,523,317 B2 | 4/2009 | Oswald et al. |
| 7,849,307 B2 * | 12/2010 | Roskind ........................ 713/155 |
| 7,908,476 B2 | 3/2011 | Kandasamy et al. |
| 8,199,911 B1 | 6/2012 | Tsaur et al. |

(Continued)

OTHER PUBLICATIONS

Kim et al; "Integration of a Cryptographic File System and Access Control"; Intelligence and Security Informatics Lecture Notes in Computer Science vol. 3917, 2006, pp. 139-151.*

(Continued)

*Primary Examiner* — Jason Lee
(74) *Attorney, Agent, or Firm* — Cesari and McKenna, LLP

(57) ABSTRACT

Seamless, secure, private, collaborative file synchronization across trust boundaries, typically as a companion to a store and sync file service. Information needed to recover a file is stored within the file itself, without giving away secret data. User specific personal keys are preferably only stored on the users' device(s). A unique ID is also created for each protected file; a password is generated that depends on (a) a key value that can either be (i) the user's personal key in the case of a file that is to be private or (ii) a shared key in the case of a file that is to be shared with other users, and (b) the unique file ID. The password is then encrypted using a recovery key and also stored in the file itself. The file is secured using a format that supports password-based content encryption.

11 Claims, 10 Drawing Sheets

(56) References Cited

U.S. PATENT DOCUMENTS

| | | | |
|---|---|---|---|
| 8,200,964 | B2 | 6/2012 | Perlman et al. |
| 2004/0059929 | A1 | 3/2004 | Rodgers et al. |
| 2007/0150299 | A1* | 6/2007 | Flory .............................. 705/1 |
| 2007/0282757 | A1 | 12/2007 | Pandya et al. |
| 2009/0254762 | A1 | 10/2009 | Priel et al. |
| 2011/0047195 | A1* | 2/2011 | Le et al. ...................... 707/827 |
| 2011/0252071 | A1 | 10/2011 | Cidon |
| 2011/0258426 | A1 | 10/2011 | Mujtaba et al. |
| 2012/0192084 | A1* | 7/2012 | Dura et al. .................... 715/751 |
| 2013/0080765 | A1 | 3/2013 | Mohanty et al. |

OTHER PUBLICATIONS

BoxCryptor Flyer "BoxCryptor—On-the-fly Encryption for cloud storage" http://www.boxcryptor.com, 3 pages.

"Cloud Encryption" Vormetric flyer, vormetric.com, 1 page.

Cloudfogger "Cloudfogger Download" Flyer, www.cloudfogger.com, 2012, 1 page.

Team Drive "TeamDrive—sync your files easily and securely . . . " Flyer, www.teamdrive.com, 2012, 2 pages.

Truecrypt, "Truecrypt—Free Open-Source Disk Encryption—Documentation" Flyer, www.truecrypt.org/docs, 1 page.

Windows User Manual, 2012, 31 pages.

CipherCloud flyer "Data Encryption for the cloud" www.ciphercloud.com/cloud-encryption.aspx, 2012, 2 pages.

Kim et al; "Integration of a Cryptographic File System and Access Control;" Intelligence and Securities Informatics Lecture Notes in Computer Science vol. 3917, 2006, pp. 139-151.

Tadayoshi Kohno, "Attacking and repairing the winZip encryption scheme," Proceedings of the 11$^{th}$ ACM Conference on Computer and Communications Security, CCS '04, Jan. 1, 2004, 10 pages.

International Search Report and Written Opinion mail date Mar. 18, 2014 for International Application No. PCT/US2013/070905 filed on Nov. 20, 2013 by nCrypted Cloud LLC, 13 pages.

* cited by examiner

GRAPHICAL USER INTERFACE FOR SEAMLESS SECURE PRIVATE COLLABORATION

CROSS-REFERENCE TO RELATED APPLICATIONS

The present application is a continuation of commonly assigned copending U.S. patent application Ser. No. 13/743,051, which was filed on Jan. 16, 2013, by Nicholas Stamos and Igor Odnovorov for a SEAMLESS SECURE PRIVATE COLLABORATION ACROSS TRUST BOUNDARIES, which is a continuation of commonly assigned copending U.S. patent application Ser. No. 13/690,800, which was filed on Nov. 30, 2012, by Nicholas Stamos and Igor Odnovorov for a SEAMLESS SECURE PRIVATE COLLABORATION ACROSS TRUST BOUNDARIES, both of which are hereby incorporated by reference.

BACKGROUND

1. Technical Field

This patent application relates to secure, collaborative file sharing across trust boundaries and among different devices and users.

2. Background Information

File hosting services that offer cloud storage and file synchronization across multiple client devices are becoming an increasingly popular way to store computer files. These services allow users to create a special folder on a computer, which the service then synchronizes so that it appears to be the same folder with the same contents regardless of the particular device on which the folder is viewed. Files placed in this folder are also accessible through a website and mobile phone applications. Services of this type include Dropbox™, Google Drive™, Microsoft™ SkyDrive™, and others. The providers of these services typically offer software for different operating systems such as Microsoft Windows™, Apple™ Mac OSx™, Linux™, Android™, Apple iOS™, Blackberry™ OS™ and web browsers. The popularity of these services is no doubt due to the increasing tendency of each person to use multiple devices such as laptops, desktops, smart phones, tablets, etc. while expecting their information to be available anytime, anywhere.

These services in effect add synchronization and sharing to simple file hosting services. Synchronization supports background distribution of files across the user's various devices, as well as revision management, so that a file edited or deleted on one machine may be recovered from any of the other synced machines. Some of these services also support multiuser version control, enabling several users to edit and repost files without overwriting versions of the same file created by other users.

A number of innovative uses and mashups of these "store and sync" technologies have been developed. For example, add-ons to the Dropbox Service allow users to email files, facilitate online backup using protocols such as File Transfer Protocol (FTP), provide an interface to desktop applications, and include extensions that support file synchronization with other services such as Google Docs.

SUMMARY

While these store and sync services have found widespread use and provide many advantages they are not without their shortcomings.

One important shortcoming involves security. Some services do provide a measure of security through use of particular storage systems. For example, Dropbox uses Amazon's™ S3 storage system that supports Secure Sockets Layer (SSL) transfers for file synchronization via the Advanced Encryption Standard (AES). However any user that has been authorized to access another user's Dropbox folder will be granted access to all of the contents of that folder. Therefore, these services provide no easy way to manage security on a per file, or even per-folder, basis.

The service provider also many times maintains access to end user stored data, by having access to the user's encryption keys, for the purpose of data deduplication, data visibility on web browser interface or the mining of metadata. This is clearly less than ideal from the user's perspective, who would prefer to have some assurance that their confidential information can never be compromised by the service provider.

In addition, even if a user tries to make use of passwords to protect individual files, there is still the problem of managing distribution of the password among two or more other people who wish to collaborate on a project, the tendency of people to forget passwords over time, and other problems that invariably arise with such an approach.

What is needed is a way to provide seamless, secure, private, collaborative file synchronization across trust boundaries. In preferred embodiments, a companion application can be provided to a store and sync service, or a modification to a store and sync service. In general, the approach stores everything that is needed to recover a protected file within the file itself, without giving away secret data needed to recover the file, including all information needed to recover the file in the event a password is lost.

In one specific embodiment, a personal key is generated for each user. This user-specific, personal key is derived from account credentials such as an email address and password. This user specific personal key is preferably only stored on the users' device(s) and is never sent over a network to a server. Because this personal key is derived from account credentials, it can be generated and stored on any one of multiple devices for which a specific user wishes to implement the service.

Another unique key is also created for each object, such as a file or a folder, that the user wishes to treat securely. In one example, the content of a file is secured when file is created and/or updated as follows. A unique folder key value and key identifier are generated for each folder that is to be secured. For each file in the folder a unique file ID is generated. Each such file is protected with a password which is derived from the (a) a key value that can either be (i) the user's personal key in the case of a file that is to be private or (ii) a shared key in the case of a file that is to be shared with other users, and (b) the unique file ID for the file. The password is then encrypted using a recovery key and then stored in the file itself. The file is then secured by storing the contents using a .zip archive or other file format protected with password-based file content encryption.

This approach provides file security via (a) the access controls implemented by the store and sync service, which control access to each file and therefore also control access to the unique key for each file and (b) the fact that the personal key is only generated on the user's device and is never forwarded to a server. Further, by always carrying the information needed to recover the file within the file itself, it is always possible to recover the contents of the file from the file itself.

In addition, a recovery key ID is preferably stored with each file to enable recovery of the file in the event that the owners' account password changes, the owner's password is lost, or in other situations.

The recovery key and recovery key ID are personal to the owner of the file, and may be stored on a server.

In a preferred embodiment, files that the user wishes to secure are instantiated using a digital file container (or wrapper) such as the .zip format, .pdf format, or any other standardized file format that support password-based file encryption and which can be read across many different types of devices and operating systems. The container should also provide some way to maintain metadata with each file as explained above. For example, in the case of a .zip file, a comment field is available to store this metadata.

The metadata for each secured file may typically include the unique ID for the file, an ID for the file key, the recovery key ID and a recovery Binary Large Object ("blob") that consists of the file's password encrypted with the recovery key. Other sets of keys and blobs can also be included in the metadata, to provide recovery by corporate, enterprise and or other access levels beyond the owner's access.

The file key and file key ID thus become a "collaborative" key in the case of a file that is to be shared, since that information will need to be available to any other user having access to the file. More specifically, collaboration with secure file sharing across trust boundaries is also possible with this approach. Here, The generated file key and file key ID instead become shared key ID and a shared key value. These keys are then used instead of the personal keys to secure the files. Thus, when a decision is made to share particular file (or folder), these "shared securely" keys are stored with a manifest file associated with the folder. This manifest file or configuration file thus contains the shared folder ID, the shared folder key ID and the recovery key ID.

Certain types of file container formats (such as .zip), allow a single container to hold many files and folders and are thus preferred for providing a securely shared folder service. In this type of container, a specialized separate file can serve as a manifest file that may contain the metadata indicating the key ID for the container file. This manifest file is then accessed to obtain the information needed to access the files and file folders within the .zip archive.

.pdf type containers typically do not support multiple files or folders within each container, but they can provide additional functionality in that they inherently support granular access policies such as view, print, edit and so forth for each file.

The approach also allows layering of additional access policies such as open enrollment, server-managed access to keys, file sharding, and so forth.

BRIEF DESCRIPTION OF THE DRAWINGS

The description below refers to the accompanying drawings, of which.

DETAILED DESCRIPTION OF AN ILLUSTRATIVE EMBODIMENT

With reference now to the figures, the novel aspects of a system and method for seamless, secure, private collaborative information sharing across trust boundaries will be described. It should be understood that these drawings and the accompanying text illustrate examples only, and are not intended to assert or imply any limitation with regard to the data processing environments in which these techniques may be implemented or how they are implemented. Many modifications to the depicted environments and implementations may be made.

Figure 1:
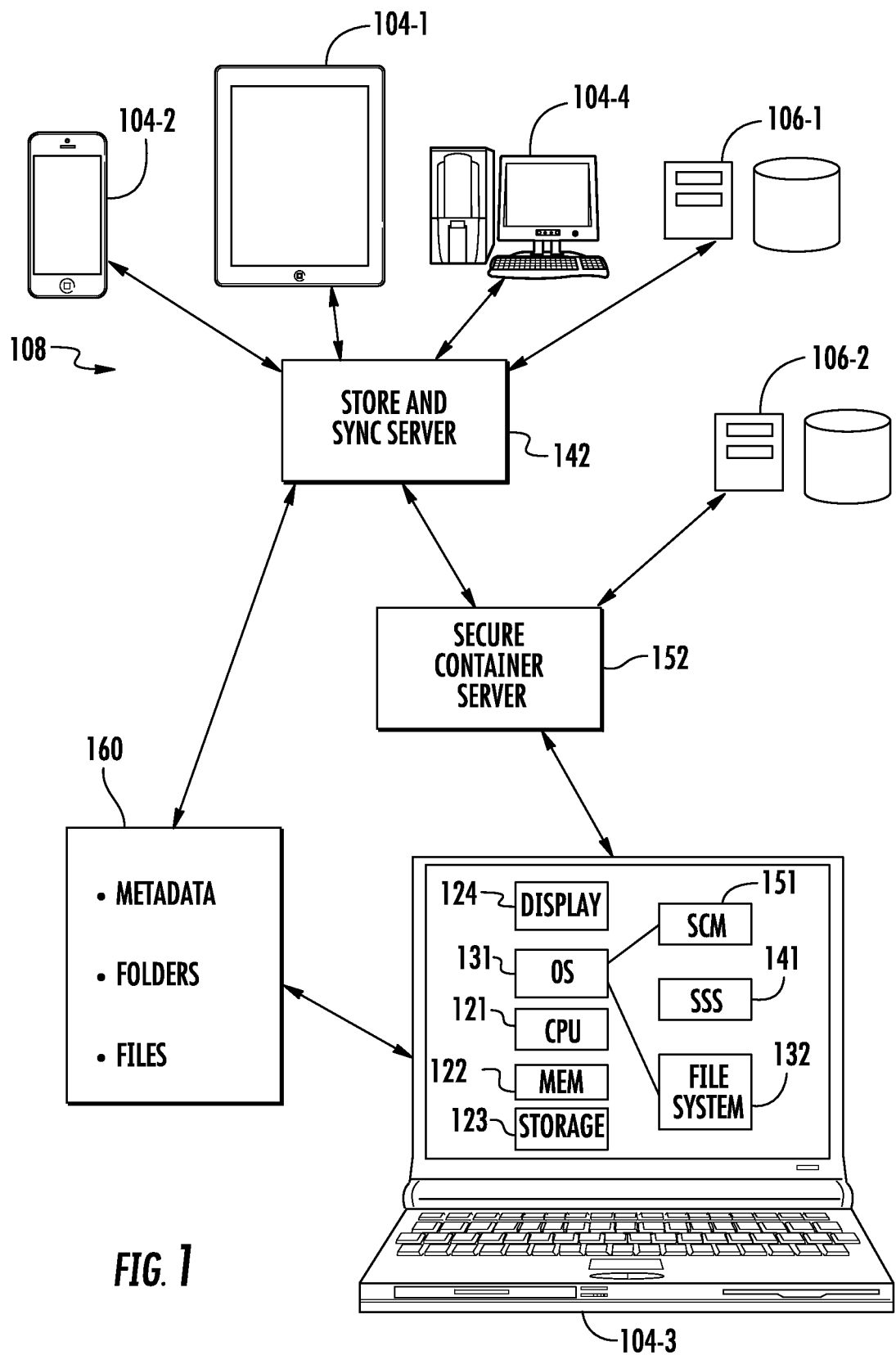
FIG. 1 is a high-level diagram illustrating a network of data processing systems in which preferred embodiments may be implemented.

More particularly, FIG. 1 illustrates a network of data processors that includes client devices, such as tablet 104-1, smart phone 104-2, laptop 104-3, desktop 104-4, and one or more file servers 106-1, 106-2. The data processors are interconnected via one or more networks 108 that provide communication links between the various client devices 104 and servers 106. The communication links may include wired, wireless, fiber optic or other physical link types. It is understood that each of the client devices 104 and servers 106 thus each includes a network interface enabling it to communicate with other data processors connected in the network 108. The network 108 may also use any number of protocols to support these connections; one quite widespread protocol is the Transmission Control Protocol/Internet Protocol (TCP/IP) suite of protocols. The network may include intranet, local area network, wide-area networks and other types of networks. Therefore, the specific illustration of FIG. 1 is intended only as an example and not as an architectural limitation on different embodiments of the network types or data processing hardware.

In the lower right-hand corner of FIG. 1, one of the data processors—specifically laptop 104-3—is shown in more detail as an example client device that a user is presently interacting with. As with most any data processor, laptop 104-3 includes a number of hardware elements such as a central processing unit 121, memory 122, storage 123, and touch sensitive display 124. An operating system 131 executes software to enable the user to perform various functions and run applications. Of significance here is that the operating system enables the user to create, edit, delete, and manage data files using a native file system 132. A file system 132, as used herein, is any resource for storing information and/or data on a computer. File system 132 can be a part of the operative system 131 or layered on top of it. The file system 132 typically provides both physical and logical methods for organizing the user's data. As can be appreciated, data stored in files on a file system are frequently sensitive in nature such that it is desirable to prevent at least some users of the network 100 from being able to access the user's data, while at the same time allowing the user to collaborate and share selected data with other users.

The laptop 104-3 also has access to a store and sync service via a client application 141 that enables the laptop 104-3 to access a file service that is managed by a store and sync server 142. This Store and Sync Service (SSS) application 141 may be part of the file system 132, layered on top of the file system 132, make system-level calls to the file system 132, or embedded in the operating system 131. In many cases, the store and sync service client 141 is an application that runs on top of the operating system 131. This allows it to be installed by a user who does not have administrator privileges. Indeed, the widespread popularity of store and sync services such as Dropbox, Google Drive, Microsoft Sky Drive and the like is due in no small part to their being an application-level service that is easily installed and managed by a user with limited computer experience.

The store and sync application 141 thus cooperates with other elements implemented in the network 100 such as file server 142 to enable the user to access various file services. More specifically, the store and sync service enables a user to create a special folder on one or more of their devices such as laptop 104-3. The store and sync client 141 and server 142 components (collectively referred to here has the store and sync service) then automatically and transparently synchronize the contents 106 of that folder and/or files and/or related metadata across other devices controlled by the user such as tablet 104-1 and smartphone 104-2, so that they appear to be the same folder and/or the same file with the same contents regardless of the device 104-1, 104-2, 104-3 on which it is viewed. Files placed in this folder can also typically be accessed by other users, such as via a desktop 104-4, if the original user has decided to share the file with these other users.

Of particular interest here is that the user has installed an additional application 151 that provides access to a Secure Container Management (SCM) service. The SCM service also has a component operating in the network such as server side component 152 on a still further server 106-2. The SCM client 151 and SCM server 152 components (collectively referred to here as the SCM service) cooperate to further operate on the files and folders that the user creates using the store and sync service.

It should be understood that the SCM related components 151, 152 can be installed and can operate separately from the store and sync components 141, 142 or may be an integral part thereof.

Figure 2A:
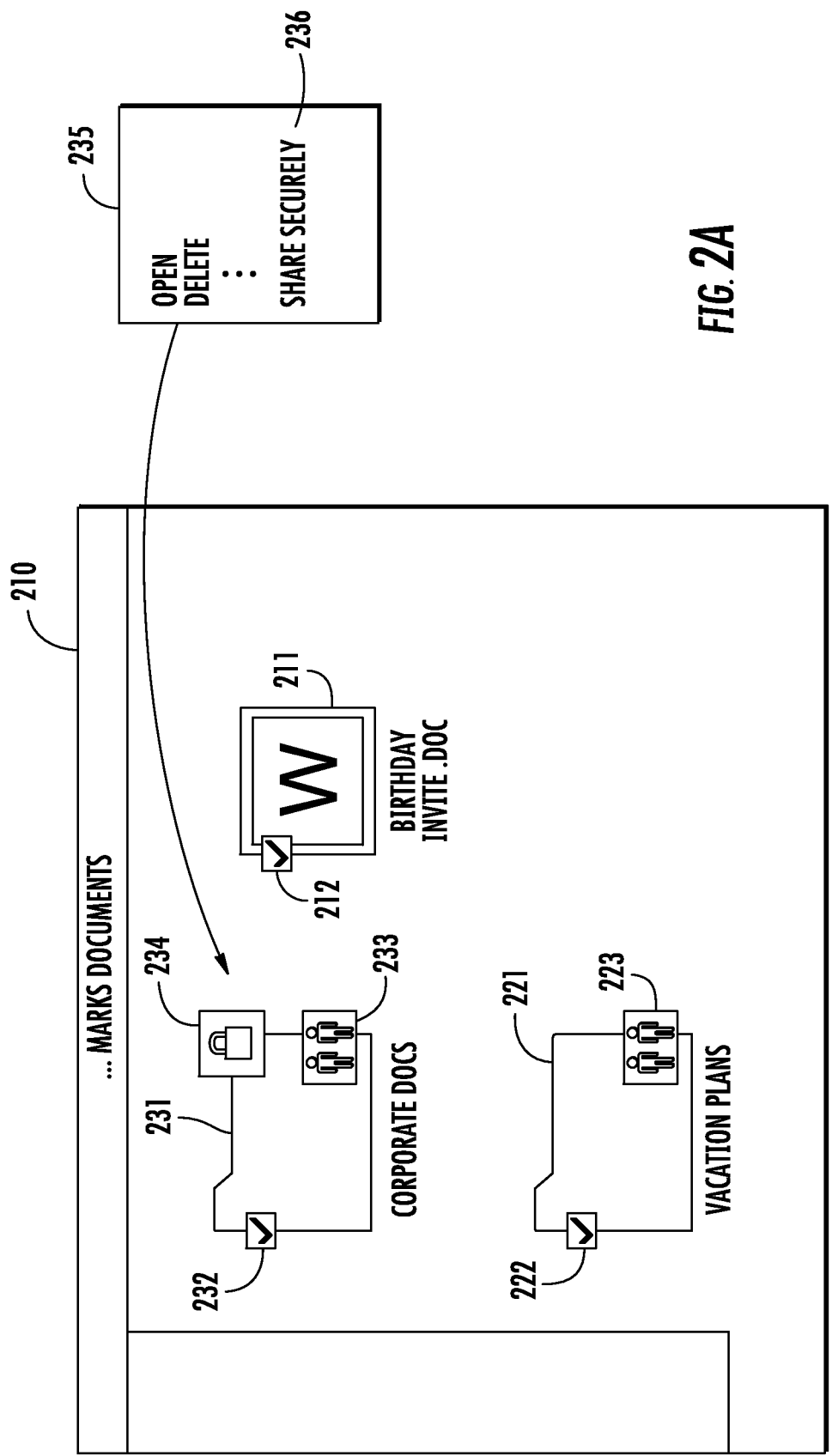
FIGS. 2A through 2E illustrate a user's view of the contents of a file container from within the secure container management application as compared to a view from the store and sync service application.

FIG. 2A illustrates a view of a folder that the user of laptop 104-3 may see with the SCM client application 151 active. The view is an "icon-type" of the contents of a folder 210 labeled "Mark's Documents" that includes three items—a document file named "birthday_invite.doc" 211, a shared sub-folder 221 named "Vacation Plans" and a secure shared sub-folder 231 named "Corporate Docs".

The birthday_invite.doc file is a Microsoft Word document and is illustrated with a Word icon 211 as provided by the native file system 132. An additional, smaller checkbox icon 212 appears next to the Word icon. The checkbox icon 212 is added by the store and sync service to indicate that this file has been synchronized among the user's devices. For example, the user of laptop 104-3 may also be a user of tablet 104-1 and smartphone 104-2, and the checkmark indicates that the file is currently synchronized among this user's three devices.

The sub-folder "Vacation Plans" is similarly illustrated with a native file system folder icon 221 and an adjacent checkmark icon 222 indicating that the store and sync service has synchronized the contents of this sub-folder across the user's three devices. This folder is also being shared with other users of the store and sync service as indicated by the addition of yet another small icon 223 adjacent the folder icon 221. An appropriate icon may be an icon illustrating two or more persons, and is rendered according to the share and sync application 141.

The third item shown is the sub-folder 231 "Corporate Docs". This folder has been synchronized by the store and sync service as indicated by small icon 232 and is also being shared as indicated by the share icon 233. However a third small icon 234 indicates that this file has been securely stored by the SCM service. The "shared securely" icon 234 may take the form of a key lock or other appropriate visual indication. This folder contains sensitive information (such as the corporate documents), which the user wishes to share with other people at his place of work. However, the user does not wish to share the contents of this folder with anyone else, and the user wishes to have added security applied to the contents of this folder. The user has enabled this feature for this particular folder 231 such as by the user previously interacting with a menu (shown in FIG. 2A at 235) that may have been activated by "right clicking" on the folder icon 231 and selecting a "share securely" option 236.

It should be understood that the SCM view shown in FIG. 2A is an artifact of the operation of the SCM client 151 and SCM server 152 and in no way affects the operation of the store and sync service. In addition, the SCM client 151 ensures that artifacts of the file and folder structure(s) needed to securely share the contents of folder 231 are hidden from the user.

Figure 2B:
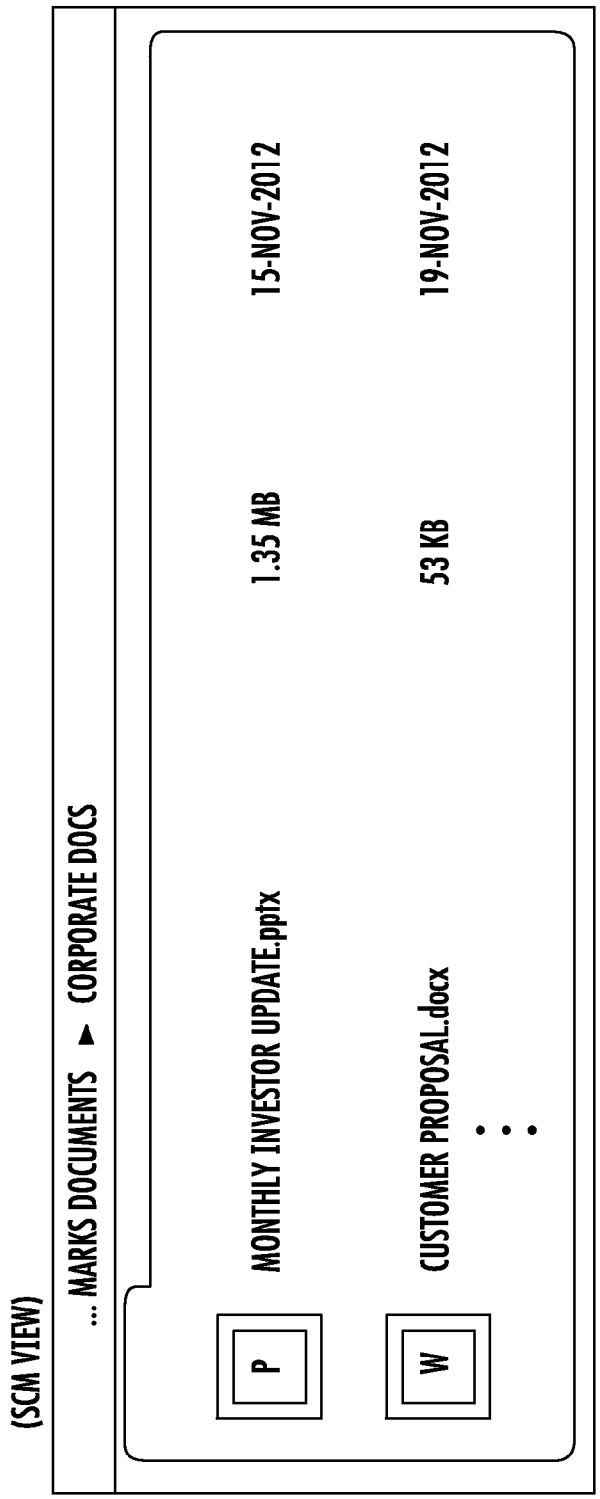
Figure 2C:
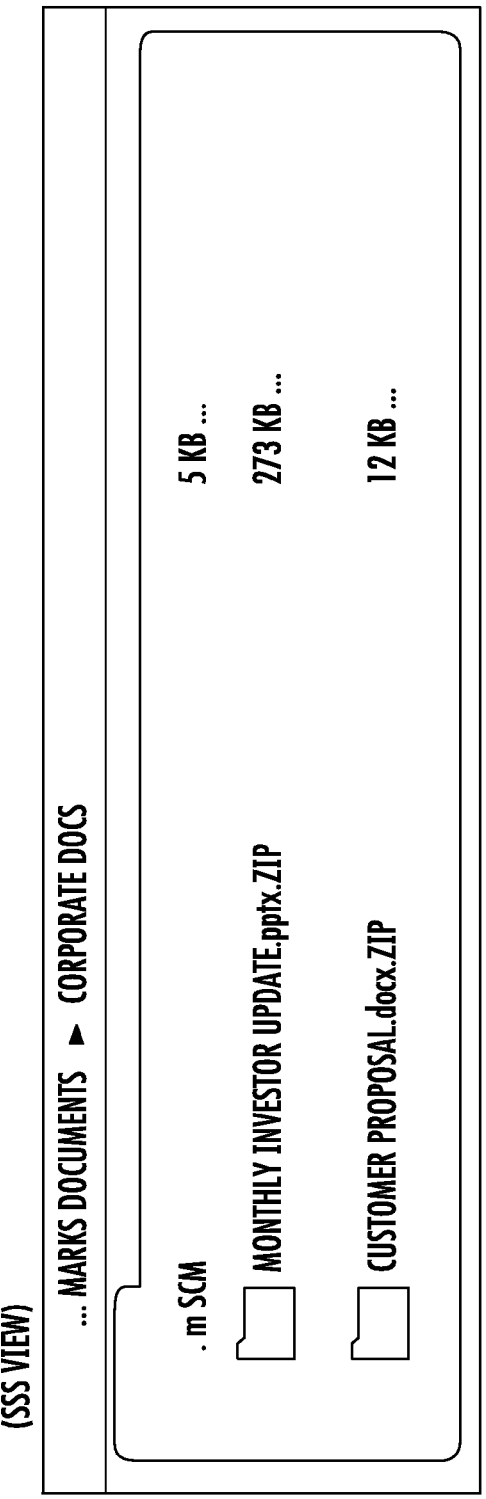

FIGS. 2B and 2C illustrate this. For example, if the user were to access and view the contents of the folder 231 via the store and sync client 141, he would see the view of FIG. 2B. The folder 231 is seen to contain two documents, a Microsoft PowerPoint file named "Monthly Investor Update.pptx" and a Microsoft Word document entitled "Customer Proposal-.docx". The .pptx file is shown with a file size of 1.35 MB (MegaBytes) and the .docx file is 53 KB (KiloBytes) in size.

However, as shown in FIG. 2C, if the user views the content of folder 231 via an application that is not aware of the SCM service (such as a view provided by the store and sync client 141 or native file system 132), he may instead see three documents. A first document is a manifest file ".mSCM" that contains certain information created and maintained by the SCM service. In addition, the user may see a pair of .zip files, "Monthly Investor Update.pptx.zip" and "Customer Proposal.docx.zip", corresponding to the user's two files. These files are thus actually being maintained as .zip archive files, and so their actual respective file sizes (273 KB and 12 KB, respectively) are evident. Thus the view of FIG. 2B illustrates a larger "unzipped" (or more precisely, the "decrypted") file size whereas in fact the files were compressed .zip files. The SCM service thus provides a logical or "virtual" view of the user's files and folders.

Figure 2D:
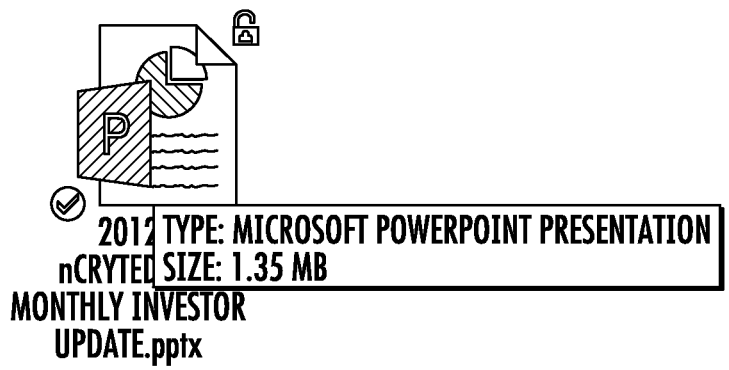
Figure 2E:
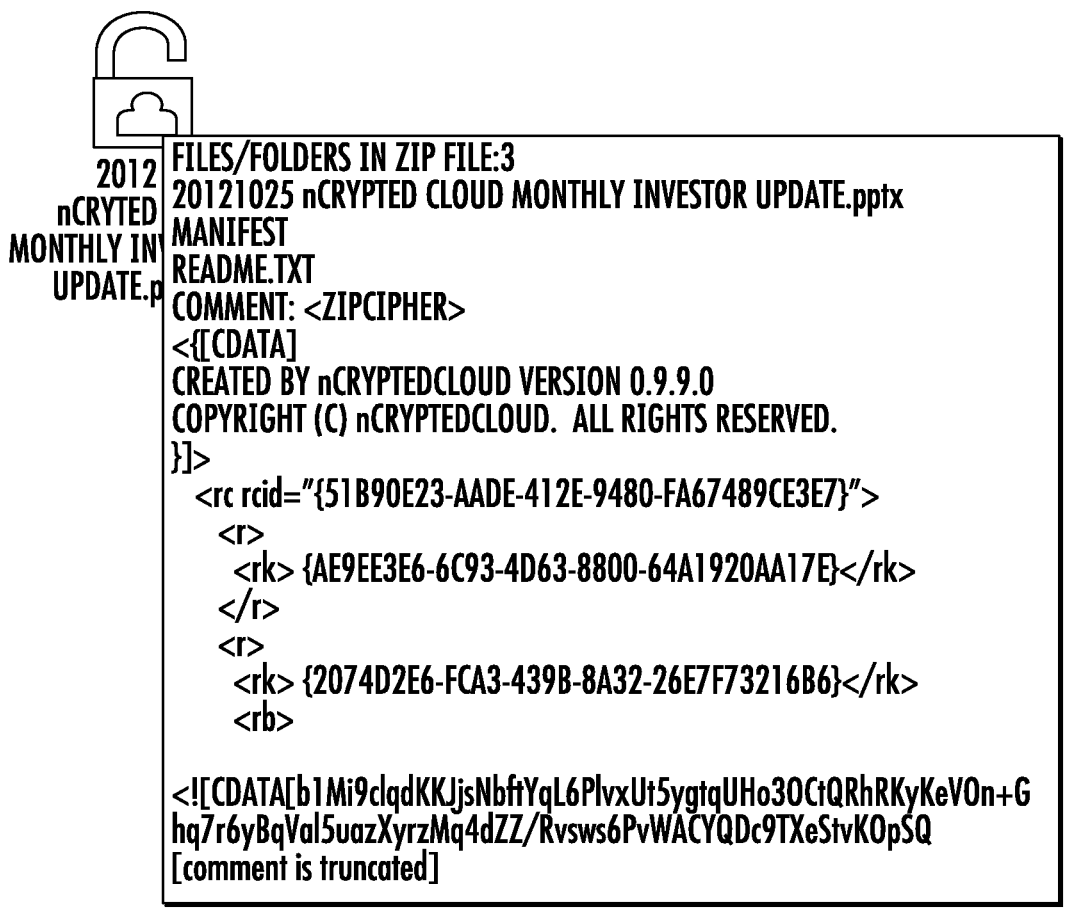

FIGS. 2D and 2E show further details of how the respective views might differ. FIG. 2D illustrates what the user would typically see when "mousing over" the Montly Investor Update.pptx file from within the SCM application 151. They see the same information that would be provided by the Microsoft Windows file system, e.g., the file type and size. If the user views the same file from within the store and sync service application 141 (or within Windows directly), a mouse over illustrates the information shown in FIG. 2E, including certain information needed to maintain the shared securely status of this file.

All of this information needed to maintain the shared securely features associated with the SCM view of FIG. 2B is in fact stored in the folder 231 or within the secured file itself, in a manner described in more detail below. It can now be understood that this system thus operates with the store and sync service mainly responsible for interacting with the file systems 132 of the various devices to read, write, and synchronize files across devices 104, while the secure container management service focuses on the organization of files as secure containers and manages password access to those secure containers among devices.

Figure 3:
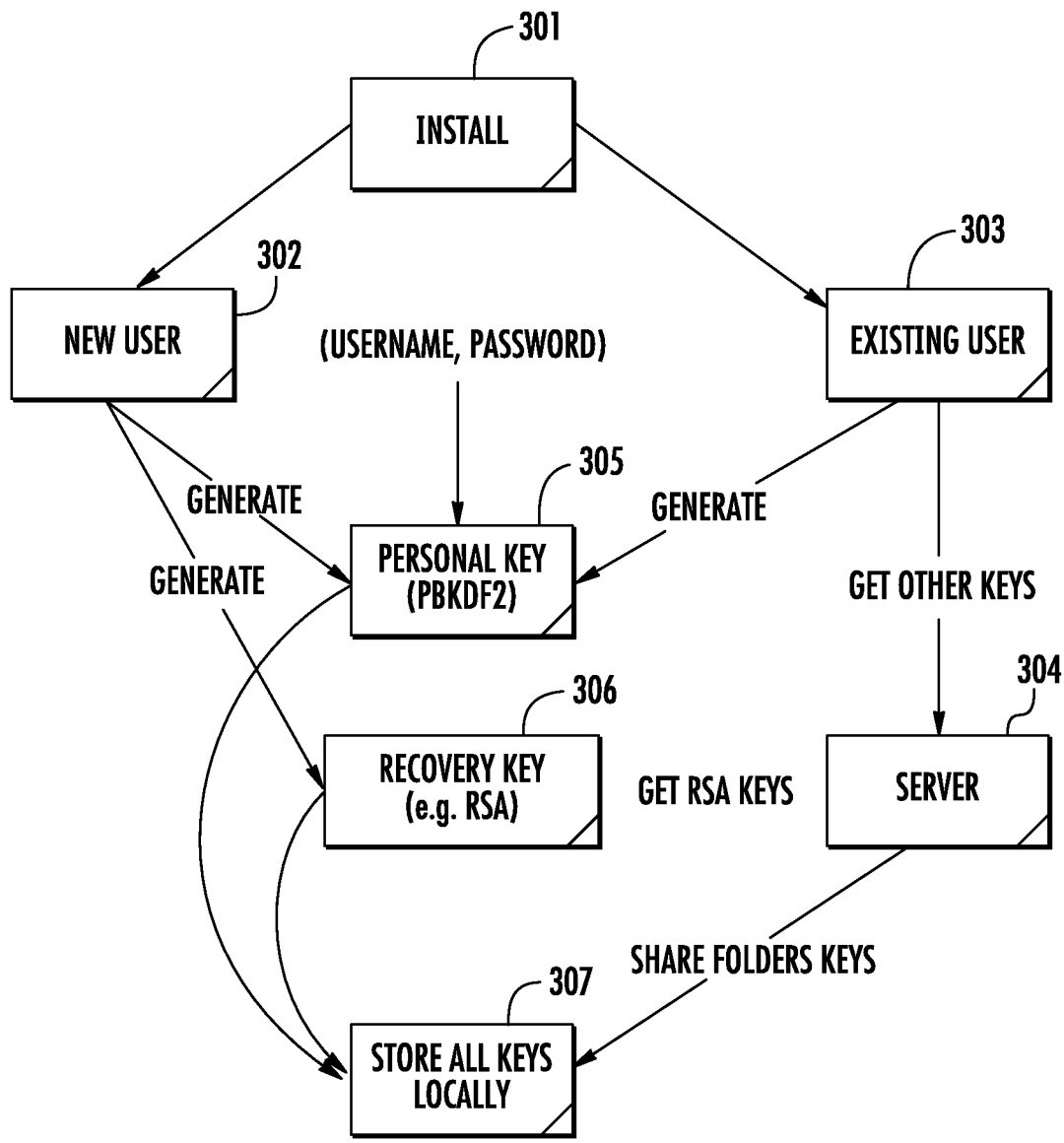
FIG. 3 is a flowchart of a key storage initialization process.

FIG. 3 illustrates a sequence of steps performed when the user originally signs up to access the SCM service. In an initial state 301, the user requests installing the software on his device 104-3 (refer also to FIG. 1). A decision is then made as to whether the user is a new user or an existing user. In a case where the user is new, he is asked for a username and password. This information is then used in state 302 to generate a personal (symmetric) key 305. When the SCM client 151 is initially installed by the user, the SCM client 151 creates a key store in state 307 to retain this information. This key store will be stored locally on the user's device 104-3.

The personal key 305 is derived from the user's username and password information, to ensure that the same personal key can be generated on any other machine 104-1, 104-2 on which the user subsequently installs the SCM client 151. The personal key 305 is preferably a symmetric key, and can be derived using any suitable key derivation algorithm. In a preferred embodiment, this is a PBKDF2 (Password-Based Key Derivation Function 2) based algorithm. In general, precautions are taken so that the personal key 305 is never stored on a server, but can be generated on any machine on which it is needed. It is possible, however, that in some embodiments, this password personal key 305 will be stored on a server protected with a security question for backup purposes, but in general the personal key 305 does not travel over the network during the file access operations described below. As will be seen, the personal key identifier does travel with the data file itself.

The recovery key 306 is used as a backup key in the event that the personal key 305 is lost. This can be generated from a random seed as an asymmetric key using any suitable algorithm such as the RSA algorithm. This recovery key is saved in the local key store on device 104-3, but can also be stored on a server 106-2 associated with the SCM service. As will be understood shortly, an identifier for this recovery key is also preferably stored in every file that the user asks to be stored securely. The recovery key is then used to protect the passphrase, which is stored within the file itself. This passphrase can be used to recover the file in the event that the user's personal key 305 becomes lost or corrupted.

In the event that the user is an existing user, state 303 is entered from state 301 in which the personal key 305 is again generated from the username and password information. Other keys associated with the user can also be retrieved from the server in state 304. This can include retrieval of the recovery key 306 that is used as the backup key as well as any keys necessary to access any shared folders.

These keys are then stored locally in state 307.

Figure 4:
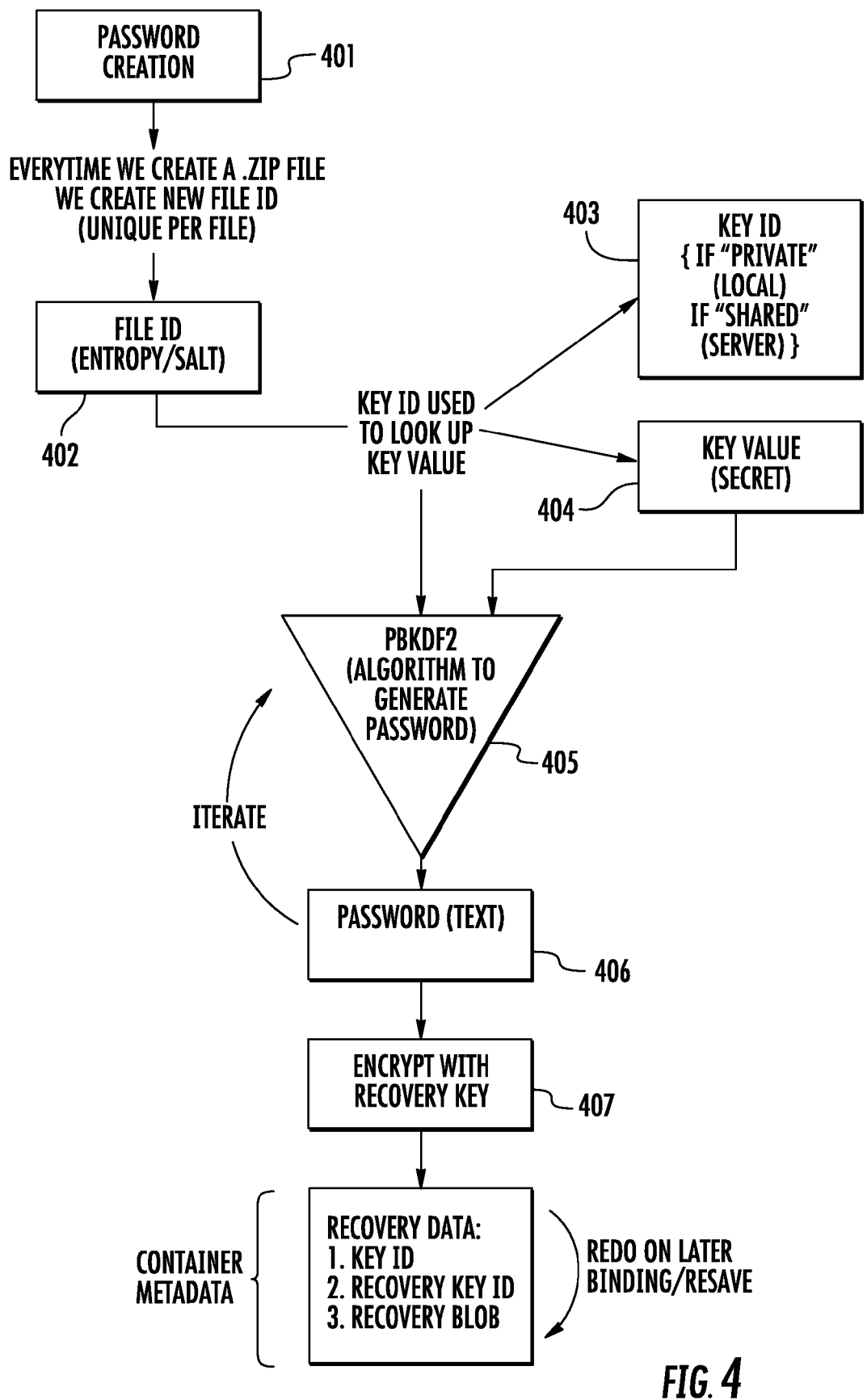
FIG. 4 is a flow diagram of a password generation based on the personal or shared key value and the unique file identifier.

FIG. 4 is a flowchart of operations performed when a request is made to securely store a file. In general, a passphrase or password is generated based on both a global unique file identifier (ID) specially created for each file and (b) a key value that can be either (i) the personal key 305 of the user that "owns" the file (in the case of a private file that is not being shared) or (ii) a shared key in the case of a file shared with other users. This password is then encrypted using the user's recovery key 306, and then stored in the file itself. This recovery key, however, is not used unless the personal key 305 associated with the user or "owner" of the file is lost.

For example, in an initial state 401 it is determined that a password needs to be generated for a new .zip file. In state 402, a new file ID is created for the file.

In state 403, the relevant password key ID is then retrieved. This will be the user's personal key ID (retrieved locally) in the case of a private file that is not being shared, or in the case of a file that is being shared, a shared key ID retrieved from a server. This password key ID is then used to lookup a key value in state 404.

This key value is then used with the unique file ID as part of an algorithm in state 405 to generate a password for the file; the key value may be used as the "secret" and the unique file ID as the "entropy" or "salt" input to the algorithm. A suitable algorithm may be the PBKDF2 algorithm. In the process of generating a password for each file, the PBKDF2 algorithm can be iterated a number of times to increase entropy of the result.

The generated password is then preferably encoded in state 406 using base 64 encoding, to obtain printable alphanumeric characters. That then becomes the password for the file; this password is then encrypted with the user's recovery key in state 407 and stored with the file.

Figure 5:
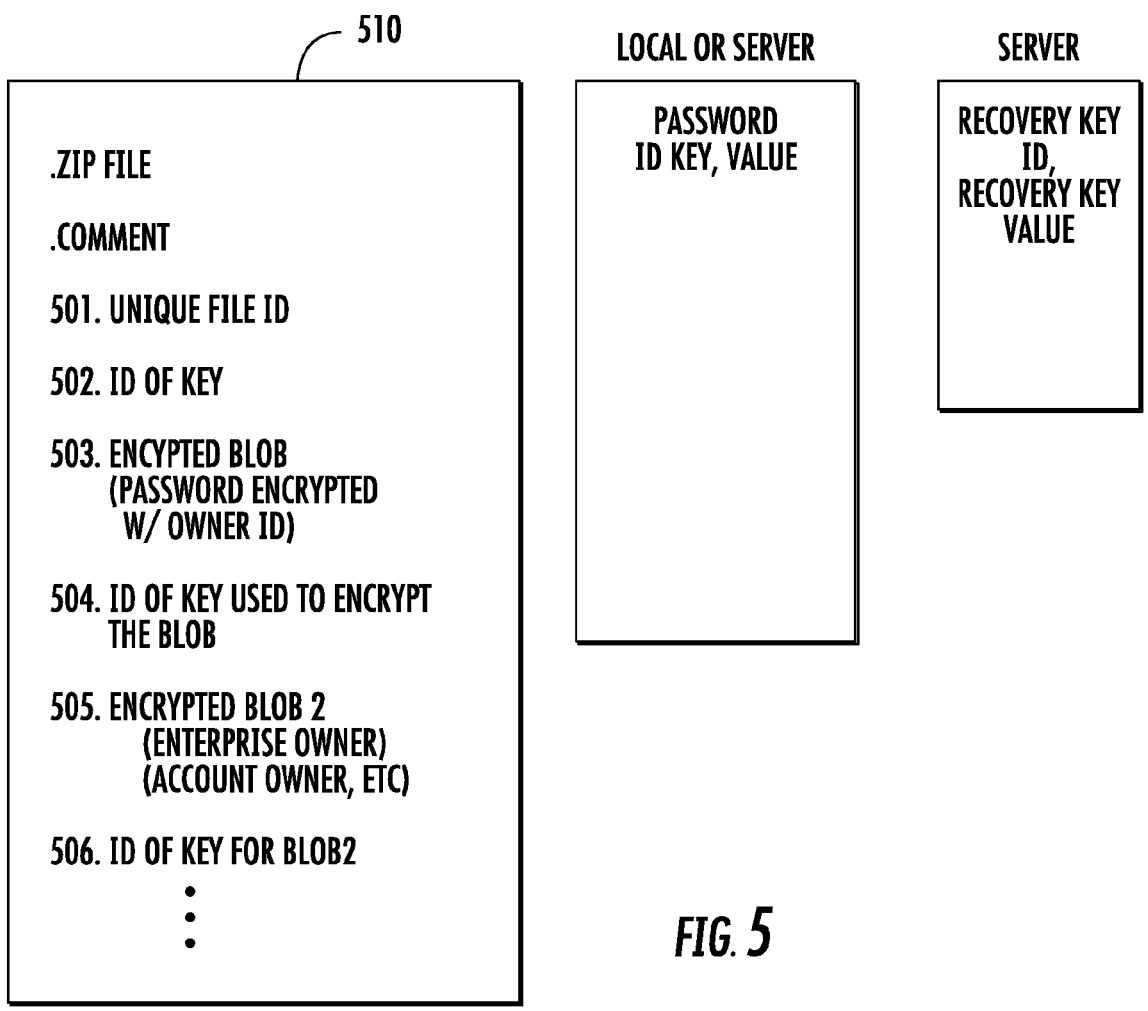
FIG. 5 illustrates metadata for a .zip container in more detail.

FIG. 5 is a diagram of the contents of a typical secure file container 510 generated by the SCM service using the password. In this example, the container is a .zip format file (for example, one of the .zip files illustrated in FIGS. 2B and 2C) and associated metadata 500 that includes the information needed to protect this container. The metadata in this example is included in the .comment field of the .zip file as XML format information. However it should be understood that other types of password-protected file formats such as .pdf, etc. that support other types of metadata access may also be utilized.

The first portion 501 of the metadata contains the unique file identifier (ID) for the file. The second portion 502 is an ID of the key value for the file. The associated key value has been stored in the key store; this will be retrieved from a local store on device 104-3, in the case of a private file that is not shared, and will be retrieved from the server 106-2, in a case of the file being a securely shared file. Thus, if a file is not being shared, any third-party user which does happen to obtain access to the container, will never have access to the key value, it being stored locally only on the user's own machine(s).

The third piece of information 503 is an encrypted blob. This is the password generated for the file (such as per FIG. 4) encrypted with the user's recovery key. The fourth piece of information 504 is the global ID of the user's recovery key used to encrypt the blob. Further encrypted blobs 505 and key IDs 506 may be associated with a file. For example, if the file owner is an employee of an enterprise, an enterprise administrator may also have his own key ID and blob to obtain access to the file.

Figure 6:
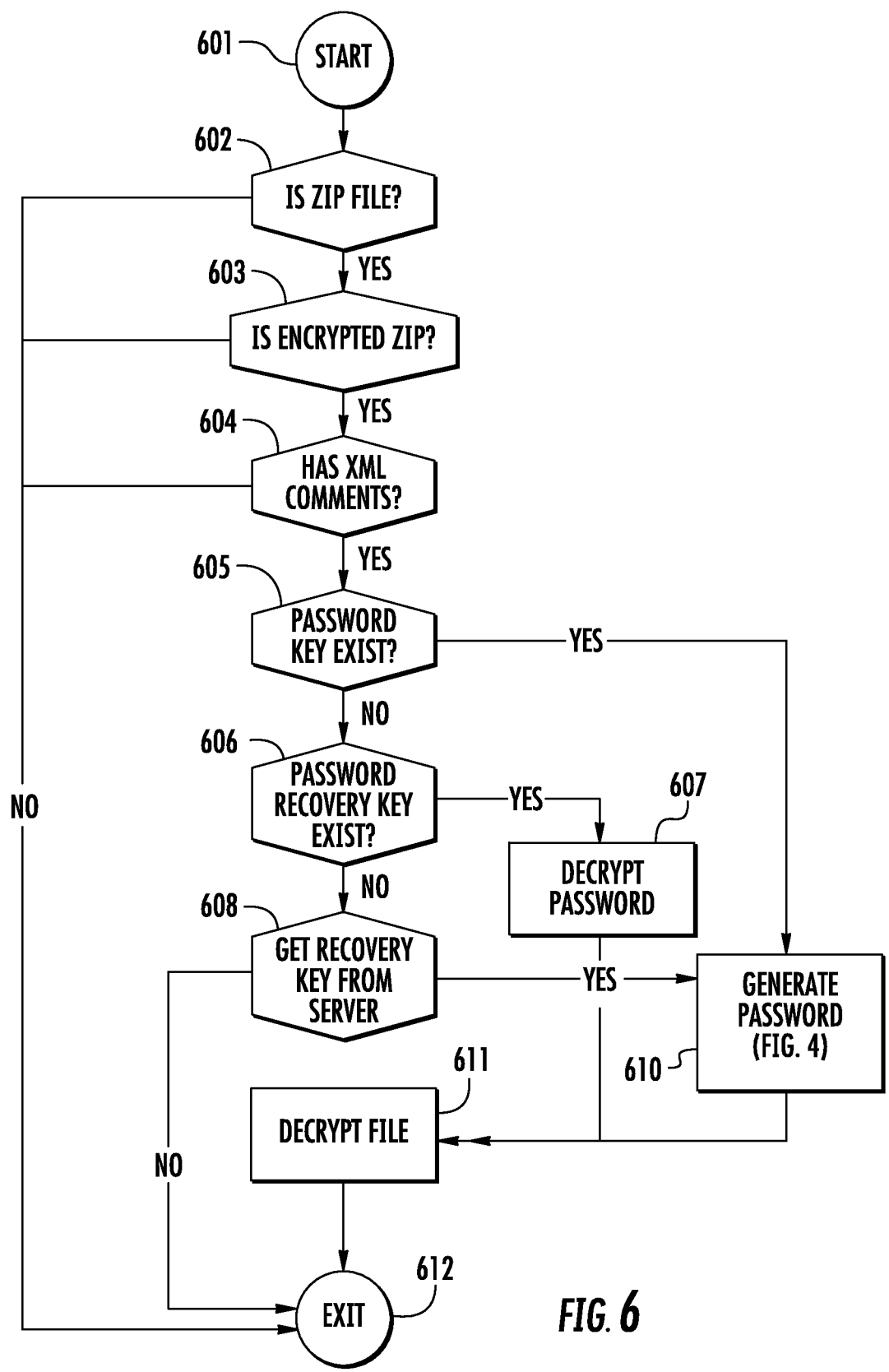
FIG. 6 is a flowchart of a file decryption process.

FIG. 6 is a flowchart of the steps performed to access a secure file. A first test is to determine if the file is a .zip file. If the file is not a .zip file, then the process exits from state 602 to state 612. If the file is not an encrypted .zip file, the process exits. If the file does not have the expected XML comment field, then the process exits from state 604. State 605 is thus only reached in the event that the file is an encrypted .zip file with an XML comment field in a format expected by the SCM service.

If the key ID (e.g., 502 of FIG. 5) indicated in the file points to a key value stored in the local key store on the client device 104-3, then state 610 can be entered, where the file password can be retrieved locally and then decryption can proceed in state 611.

If however, the password does not exist locally, a state 606 determines if the recovery key exists locally. If it does, a state 607 can be entered in which the password stored in the encrypted blob (503) can be decrypted. Then, processing can proceed to state 611 where the file is decrypted using the recovered password. If, however, in state 606, the recovery key does not exist, then the password key can be requested from the server in state 608. If successfully retrieved from the server, then file decryption can proceed, but if not, then the process must exit.

Figure 7:
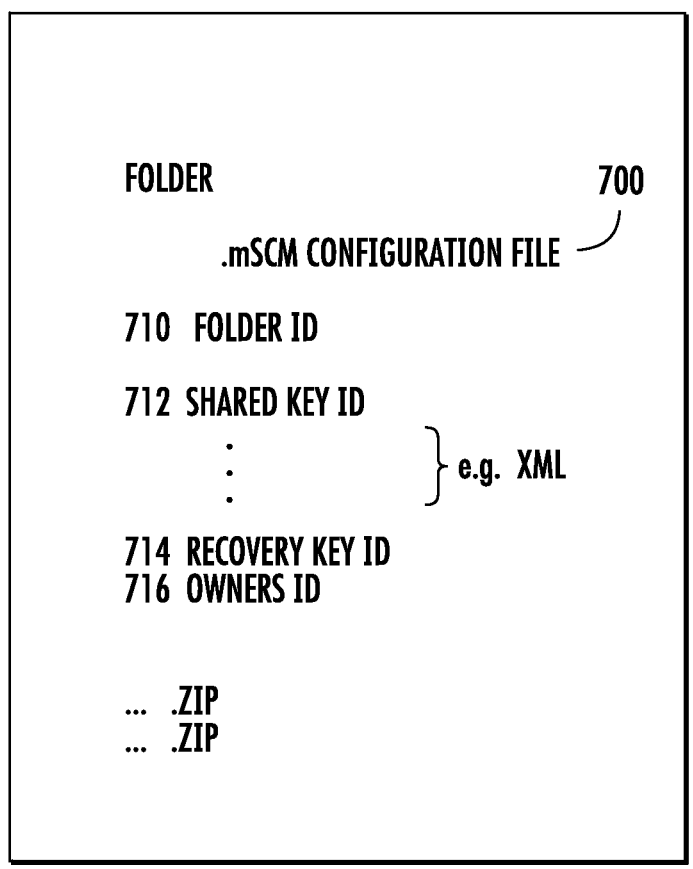
FIG. 7 illustrates a container that supports folders in more detail

FIG. 7 shows the format of the configuration file 700 kept with each folder container. In one example embodiment, it contains at least a unique ID 710 for the folder. However it may also include a shared key ID 712, as well as a recovery key 714 and the owner's ID 716.

It can now be understood that the SCM service is thus primarily concerned with managing the secure containers (.zip, .pdf, etc.) and does not provide actual security—that being the function of the password-protected container file format utilized (e.g. either .zip or .pdf). The SCM service does generate passwords from various user keys (be they a personal key or a shared key), but does not in itself perform encryption or decryption. Thus the techniques described depend on using a standard secure container such as .zip or .pdf that supports password access. The .zip format is sometimes desirable as any type of file can be placed within it, however it cannot restrict further activities with a file such as print, copy, and so forth. Other file containers, such as .pdf, limit the type of information that can be stored therein—but do offer the ability to implement granular access control over information, use such as edit, copy, print, etc. limitations.

The processes implemented by the SCM service operate at the application level and do not require modification of current operating system drivers or operator privileges to install. They also does not require the use of application programming interfaces to access store and sync services. All that the SCM service needs to know is where a file or folder is located; and once that folder is located it can then manipulate the files according to its desired processes.

It is possible to provide an additional layer of security, by updating the password every time a file or folder is accessed. In other words, every time a file is saved, a new key ID and key value can be generated, such as by assigning a new unique file ID. This comes at minimal cost because the store and sync service is going to be rewriting the file each time.

With this approach one can now provide seamless, secure, private collaboration across trust boundaries. A unique identifier for a file is established through an email account and password paradigm. The unique identifier is generated for each file the user is then bound to each as an owner with the unique ID for the folder.

If the user desires to collaborate with other users than a shared key is used to encrypt the access passphrase for the folder, then that shared key ID is distributed by the SCM service, in a manner that is transparent to the user.

When a user enables a folder for sharing, any other user having access via the store and sync service will also have access to the contents of the folder, and thus, any other user will able to obtain the password key ID needed to access the folder. The other users can then use this key ID to request the shared password key from the SCM server 152. This process can be controlled however, by the use of open enrollment periods. With this approach, an initial timeframe is established where any user having shared access to a folder is also given access to the key IDs. However, after enrollment expires, no new users are automatically allowed shared access to the files. This can prevent problems with hacking, since once the open enrollment period closes, keys will not be distributed to any new users.

One way to further improve security is to simply delete the folder key ID and value from the server 152 after open enrollment closes.

Another way to improve security can be implemented when the owner no longer wishes to share the file. Instead of simply stopping sharing (such as through the store and sync service) the secure container management service can allow users to select a "make private" command for the file. The act of a user making a previously shared file now private can then trigger re-encryption of the file with new keys. This then prevents a possible problem with users who were previously authorized to access the file having kept locally cached copies of the keys.

Figure 8:
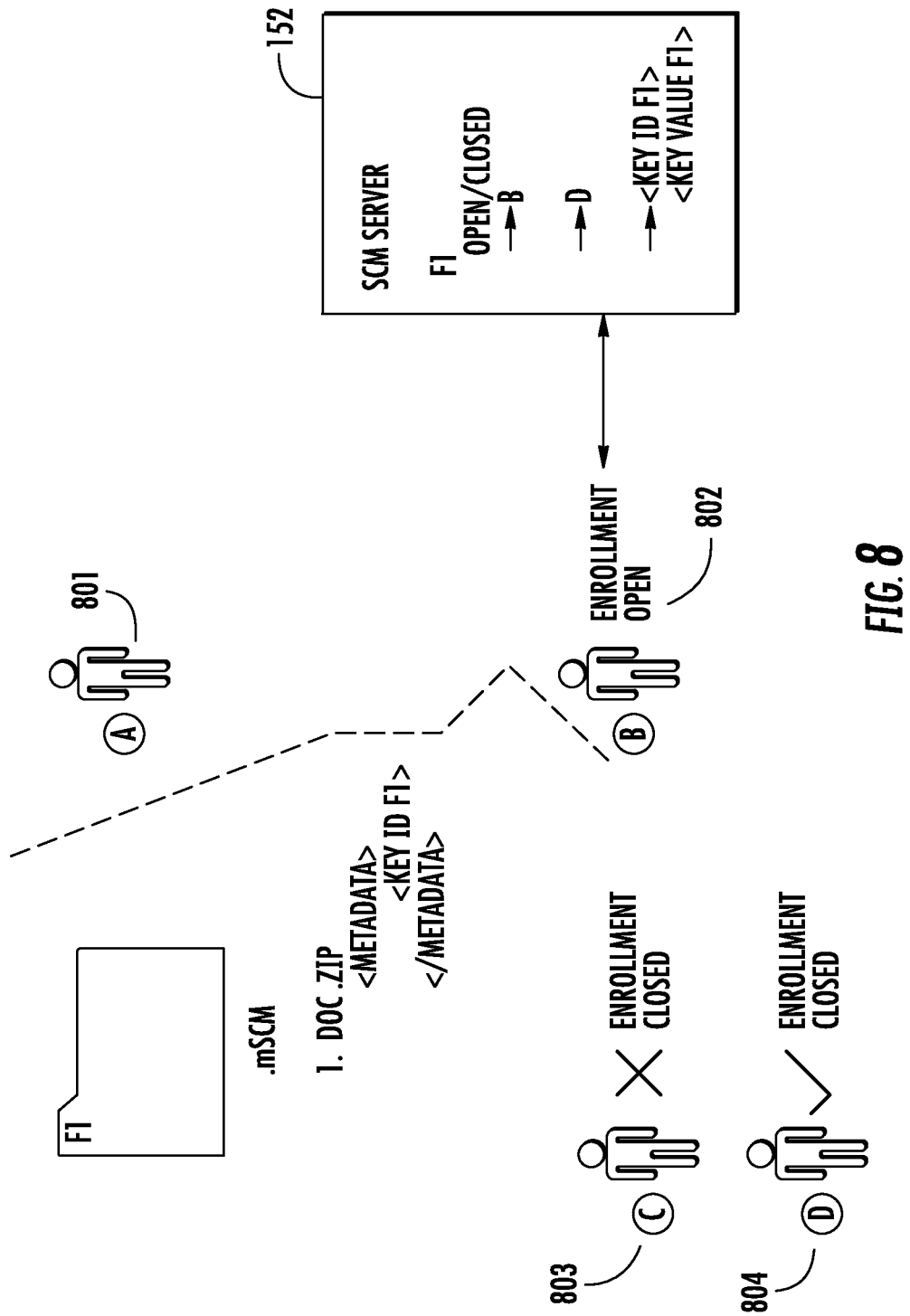
FIG. 8 is a flowchart of an open enrollment process.

FIG. 8 shows one implementation of this in more detail. In a first state 801, a first user A creates a securely shared folder named "F1". The SCM server 152 creates a table associated with the F1 folder at this time, indicating an enrollment period state (open or closed) and the key ID and value for the folder. The folder F1 takes the format of the folders previously described, that is it includes a manifest file (.mSCM file) and at least one container file here called "1.doc.zip" having a metadata field that includes at least the key ID for folder F1.

At this time, during open enrollment, in state 802, a second user B is given access to the folder F1. This can be done by user A simply using the store and sync service to add a new user. Because store and sync service will allow user B access to folder F1, the metadata in the .zip file is not a secret and user B can read the shared key ID for folder F1. User B's device can then talk to the SCM server 152 to retrieve the shared key value needed to decrypt the contents of the folder. At this point SEM server 152 returns the key value for that folder because F1 is in the open enrollment period.

At some point open enrollment closes, and the state for folder F1 is set accordingly in the table at the SCM server 152. Next in a state 803, a third user C is given access to the folder (perhaps because user granted him access using the store and sync service, or perhaps because C has hacked into the folder). Since user C has been granted access to the shared folder F1 by the store and sync server 142, it will still be able to obtain the key ID. User C's device can then send the key ID to the SCM server 152. However, the SCM server 152, seeing that the enrollment period is now closed, will not return the key value to user C. Therefore user C will not be able to access the password necessary to open up the 1.doc.zip file.

Also, in another state 804 is still possible that the enrollment period is closed. However, a fourth user D had previously request and been granted access to shared folder F1. For example, user A can inform SCM service that he wishes user D to have access to folder F1. Even though enrollment is closed, SCM server 152 will look at its table and see that user D should be granted access, and thus SCM server will return the key value to user D when requested.

In another aspect, it is possible that multiple .zip container files are used by SCM service to represent a single user file. Sharding of a file in this way can be advantageous where user files are particularly large (say, greater than 200 MB or so), where the .zip compression algorithms become inefficient.

Another added security aspect can be implemented by SCM service to obfuscate file names. Thus, rather than have a file named "1.doc.zip" be the container for "1.doc", the container file for "1.doc" can be assigned a file name generated from a random character generator.

What is claimed is:

1. A system associated with a user, comprising:
   one or more network interfaces adapted to communicate data over a computer network;
   a hardware processor coupled to the network interfaces and adapted to execute one or more processes; and
   a memory configured to store a process executable by the hardware processor, the process when executed operable to:

display a file system object icon representation of a file system object, the file system object including at least one file or one folder, determine whether a-user input is received to share or securely share a file system object that is synchronized across two or more systems associated with the user over the computer network, in response to receiving a user input to share the file system object, displaying a shared icon adjacent to the file system object icon, in response to receiving a user input to securely share the file system object, displaying a shared securely icon adjacent to the file system object icon, provide access to the file system object on systems associated with the user and on another system associated with a different user in response to determining that the user input is received to share the file system object, provide access to the file system object, utilizing a password to secure the file system object, on systems associated with the user and on the another system associated with the different user in response to determining that the user input is received to securely share the file system object, and in response to determining the user input is not received to share or not received to securely share the file system object, maintain the file system object only across one or more of the systems associated with the user.

2. The system according to claim 1 wherein the password depends on both (a) a shared key shared among the user and the different user, and (b) an identifier of the file system object, and wherein the process is further executable to store the password within the file system object.

3. The system according to claim 1, wherein the process is further executable to:

determine whether user input is received to privately maintain the system object securely, utilize a personal key unique to the user and an identifier of the file system object to determine the password for the file system object, store the password within the file system object, and wherein the password is utilized to access the file system object on at least one other system associated with the user.

4. The system according to claim 1, wherein the file system object is a file.

5. The system according to claim 1, wherein the file system object is a folder.

6. The system according to claim 1 wherein the file system object is associated with a cloud storage application.

7. A method of providing a graphical user interface (GUI) of a device for controlling shared and shared securely access to a file system object comprising:

displaying a file system object icon representation of the file system object, the file system object including at least one file or one folder, synchronizing the file system object across two or more data processing systems associated with a user, determining whether user input is received to share or securely share the file system object, and if the user input is to share the file system object, displaying a shared icon adjacent to the file system object icon, if the user input is to securely share the file system object, displaying a shared securely icon adjacent the file system object icon, the shared securely icon being visually distinguishable from the shared icon, if no user input is to share or securely share the file system object, maintain the file system object for access only by data processing systems associated with the user, providing access to the file system object on systems associated with the user and on another system associated with a different user in response to determining that the user input is received to share the file system object, and providing access to the file system object, utilizing a password to secure the file system object, on systems associated with the user and on the another system associated with the different user in response to determining that the user input is received to securely share the file system object.

8. The method according to claim 7 wherein the password depends on both (a) a shared key shared among the user and the different user, and (b) an identifier of the file system object, and the method further comprises:

storing the password within the file system object.

9. The method according to claim 7 and further:

determining whether a user input is received to privately maintain the file system object securely, utilizing a personal key unique to the user and an identifier of the object to determine the password for the object, storing the password within the file system object, and utilizing the password to access the file system object on at least one other system associated with the user.

10. The method according to claim 7, wherein the file system object is a file.

11. The method according to claim 7, wherein the file system object is a folder.

* * * * *

UNITED STATES PATENT AND TRADEMARK OFFICE
CERTIFICATE OF CORRECTION

| | | |
|---|---|---|
| PATENT NO. | : 9,015,858 B2 | Page 1 of 1 |
| APPLICATION NO. | : 14/027441 | |
| DATED | : April 21, 2015 | |
| INVENTOR(S) | : Nicholas Stamos et al. | |

It is certified that error appears in the above-identified patent and that said Letters Patent is hereby corrected as shown below:

In the Claims

Claim 3, Col. 11, line 37 should read:
tain the file system object securely,

Signed and Sealed this
Eighth Day of September, 2015

Michelle K. Lee
*Director of the United States Patent and Trademark Office*